US009462649B2

(12) United States Patent
Schneider et al.

(10) Patent No.: US 9,462,649 B2
(45) Date of Patent: Oct. 4, 2016

(54) SYSTEMS AND METHODS FOR HEATER CONTROL BY CURRENT LEVEL STEP DETECTION

(71) Applicants: John Schneider, West Springfield, MA (US); Vinicius Marcilli Petroni, Simsbury, CT (US)

(72) Inventors: John Schneider, West Springfield, MA (US); Vinicius Marcilli Petroni, Simsbury, CT (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/686,546

(22) Filed: Apr. 14, 2015

(65) Prior Publication Data

US 2015/0296592 A1 Oct. 15, 2015

Related U.S. Application Data

(60) Provisional application No. 61/979,262, filed on Apr. 14, 2014.

(51) Int. Cl.

| | |
|---|---|
| ***H05B 37/02*** | (2006.01) |
| ***F21V 29/90*** | (2015.01) |
| ***H05B 33/08*** | (2006.01) |
| ***G05B 15/02*** | (2006.01) |
| *F21W 111/06* | (2006.01) |
| *F21Y 101/02* | (2006.01) |

(52) U.S. Cl.

CPC ........... *H05B 33/0845* (2013.01); *F21V 29/90* (2015.01); *F21W 2111/06* (2013.01); *F21Y 2101/02* (2013.01)

(58) Field of Classification Search

None

See application file for complete search history.

(56) References Cited

U.S. PATENT DOCUMENTS

| | | | |
|---|---|---|---|
| 4,951,046 | A | 8/1990 | Lambert et al. |
| 5,581,229 | A | 12/1996 | Hunt |
| 5,926,115 | A | 7/1999 | Schleder et al. |
| 5,969,642 | A | 10/1999 | Runyon et al. |
| 6,437,686 | B2 | 8/2002 | Satoh et al. |

(Continued)

FOREIGN PATENT DOCUMENTS

| | | | |
|---|---|---|---|
| EP | 2582207 | A1 | 4/2013 |
| KR | 2014009658 | | 1/2014 |

OTHER PUBLICATIONS

S. Surikov, International Search Report issued in International Patent Application No. PCT/US2015/025800, completion date Jul. 1, 2015, mailing date Jul. 16, 2015, 6 pages, Federal Institute of Industrial Property, Moscow, Russia.

*Primary Examiner* — Crystal L Hammond

(74) *Attorney, Agent, or Firm* — King & Spalding LLP

(57) ABSTRACT

An airfield lighting system can comprise a control system, a constant current regulator, and a plurality of light fixtures. The control system can command the constant current regulator to output a current level transition sequence. One or more light fixtures of the plurality of light fixtures can detect the current level transition sequence and execute a command at the light fixture, such as actuating a heating element or adjusting the intensity of light emitted by a light source.

13 Claims, 5 Drawing Sheets

(56) References Cited

U.S. PATENT DOCUMENTS

| | | | | |
|---|---|---|---|---|
| 6,828,733 | B1 * | 12/2004 | Crenshaw | H02J 9/02 315/150 |
| 7,102,540 | B2 | 9/2006 | Runyon et al. | |
| 7,192,155 | B2 | 3/2007 | Morrow et al. | |
| 7,629,601 | B2 | 12/2009 | Glassner et al. | |
| 8,138,683 | B2 | 3/2012 | Catoul et al. | |
| 8,278,845 | B1 | 10/2012 | Woytowitz | |
| 8,492,983 | B1 * | 7/2013 | Berg | H05B 33/0842 315/185 R |
| 8,511,858 | B2 | 8/2013 | Morrow | |
| 8,575,862 | B2 | 11/2013 | Dubrovsky | |
| 8,629,626 | B2 | 1/2014 | Glassner | |
| 2002/0163447 | A1 * | 11/2002 | Runyon | H05B 37/0272 340/947 |
| 2005/0225976 | A1 * | 10/2005 | Zampini | B63B 45/04 362/227 |
| 2006/0255749 | A1 * | 11/2006 | Glassner | H05B 33/0803 315/291 |
| 2010/0084985 | A1 * | 4/2010 | Woytowitz | H05B 33/0842 315/210 |
| 2010/0117561 | A1 * | 5/2010 | Glassner | H05B 33/0803 315/294 |
| 2011/0121654 | A1 * | 5/2011 | Recker | H05B 37/0272 307/66 |
| 2011/0285320 | A1 | 11/2011 | Kustra | |
| 2012/0001566 | A1 * | 1/2012 | Josefowicz | H05B 33/0851 315/291 |
| 2012/0043889 | A1 * | 2/2012 | Recker | H05B 33/0815 315/86 |
| 2012/0080944 | A1 * | 4/2012 | Recker | H02J 9/02 307/25 |
| 2012/0245880 | A1 * | 9/2012 | Nabrotzky | G01R 31/086 702/122 |
| 2013/0169165 | A1 * | 7/2013 | Sadwick | H05B 33/0815 315/152 |
| 2014/0042923 | A1 * | 2/2014 | Yu | H05B 33/089 315/201 |
| 2015/0009204 | A1 * | 1/2015 | Chaji | G09G 3/3233 345/214 |

* cited by examiner

SYSTEMS AND METHODS FOR HEATER CONTROL BY CURRENT LEVEL STEP DETECTION

RELATED APPLICATIONS

The present application claims priority under 35 U.S.C. §119(e) to U.S. Provisional Patent Application No. 61/979,262, titled "Systems and Methods for Heater Control By Current Level Step Detection," filed on Apr. 14, 2014, the entire content of which is incorporated herein by reference.

TECHNICAL FIELD

Embodiments of the invention relate generally to operating a heater or other accessory of a light fixture, and more particularly to systems and methods of controlling the heater through current level step detection.

BACKGROUND

Airfield lighting systems comprise a series of light fixtures used to provide various visual signals for airfield operations. These light fixtures are typically located in the airfield, which is an outdoor environment open to the elements. Thus, during cold weather conditions, snow and ice may accumulate on the emitting portions of the light fixtures, obstructing visibility of the light. In order to resolve this issue, heating elements are provided in the light fixtures which warm the light fixtures and melt away the snow or ice that may have accumulated. Typically, the heating elements are controlled by thermistors or other temperature sensing devices. The heating elements are typically turned on when the ambient temperature falls below a certain threshold, such as 38° F., and turned off when the temperature rises a few degrees higher. This results in the heating element being on for much longer than is needed to clear the snow or ice. Thus, a large amount of electricity is wasted.

Airfield lighting systems were traditionally designed using incandescent light fixtures as the load. In order to achieve consistent brightness across all the light fixtures in a circuit, a constant current regulator (CCR) was used to maintain a constant current across the circuit. Typically, a constant current regulator can provide a range of current levels, such as from 2.8 A to 6.6 A. More recently, airfield light fixtures are being retrofitted with light emitting diode (LED) light sources. However, these new LED light fixtures as well as the heating elements are still being powered through the legacy CCR systems. Thus, it is advantageous to provide control schemes that can be implemented using the legacy CCR.

SUMMARY

In general, in one aspect, the present disclosure relates to an airfield lighting system comprising a control system, a constant current regulator, and one or more light fixtures coupled to the constant current regulator. The constant current regulator delivers power to the one or more light fixtures. The control system can communicate with the constant current regulator and can command the constant current regulator to initiate a current level transition sequence. The light fixture can detect the current level transition sequence and execute an associated command upon detecting the current level transition sequence, such as turning a heater element on or off or adjusting the intensity of light emitted from a light source.

In another aspect, the present disclosure relates to a method of operating an airfield lighting system. In the example method, a control system can determine that an element in the airfield lighting system should be turned on. The control system can transmit a signal to a constant current regulator to initiate a current level transition sequence. When the constant current regulator initiates the current level transition sequence, it is detected by a processor that can actuate the element in the airfield lighting system. For example, the processor may turn a heating element on or off or change the intensity of light emitted from a light source.

In yet another aspect, the present disclosure relates to a computer-readable medium comprising computer-executable instructions for operating an element in an airfield lighting system. The computer-readable medium comprising the computer-executable instructions can be stored, for example, within a light fixture in the airfield lighting system. The computer-executable instructions can be executed by a processor to detect a current level transition sequence received at the light fixture from a constant current regulator. Upon detecting the current level transition sequence, the processor can execute the instructions to actuate an element, such as turning on or off a heating element or changing the intensity of light emitted from a light source.

These and other aspects of the present disclosure will be described in greater detail in the following text in conjunction with the accompanying figures.

BRIEF DESCRIPTION OF THE FIGURES

Reference will now be made to the accompanying drawings, which are not necessarily drawn to scale, and wherein.

Figure 1:
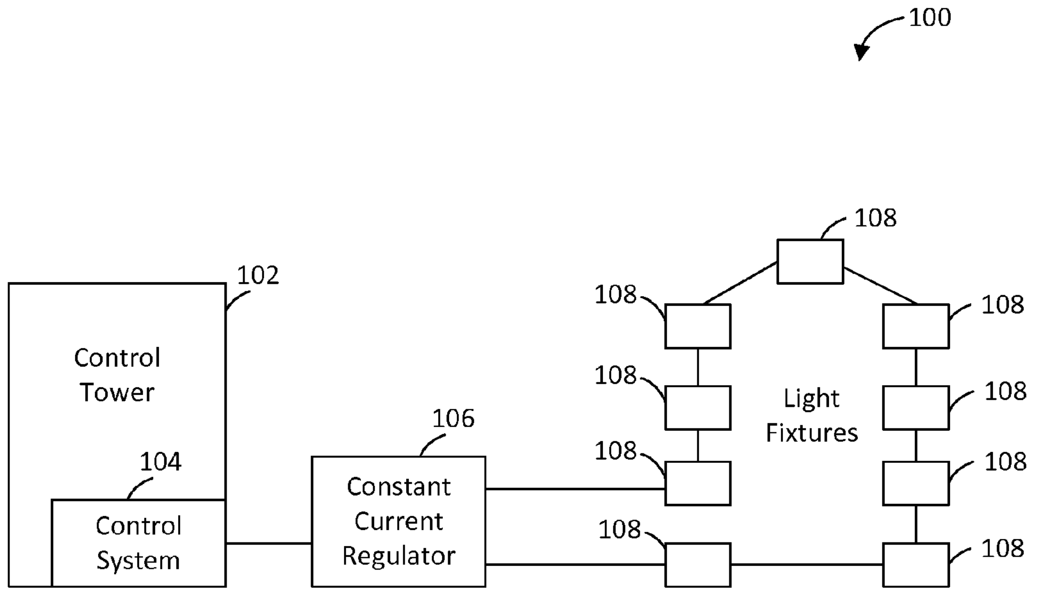
FIG. 1 illustrates an airfield lighting system with current level transition detection, in accordance with example embodiments of the present disclosure.

The drawings illustrate only example embodiments of the invention and are therefore not to be considered limiting of its scope, as the invention may admit to other equally effective embodiments. In the drawings, reference numerals designate like or corresponding, but not necessarily identical, elements.

DETAILED DESCRIPTION OF EXAMPLE EMBODIMENTS

Example embodiments disclosed herein are directed to systems and methods for controlling a heating element in an airfield lighting fixture. Specifically, techniques disclosed herein provide a means of turning the heating element on or off based on preprogrammed or manual control schemes using existing legacy CCRs. A legacy CCR typically can provide power at a plurality of current levels or steps. For example, a CCR with five current levels can provide outputs at 2.8 A, 3.4 A, 4.1 A, 5.2 A, and 6.6 A. When controlled, the CCR can switch between these current steps. The present disclosure provides systems and methods of controlling the heating element through a signal generated by the switching of current steps in the CCR. The techniques provided herein also provide a means of changing the intensity of the LEDs in the light fixtures. Although the embodiments provided herein are directed to controlling operation of the heating element and the LED, such techniques can also be applied to control various other components or operational parameters of an airfield light fixture.

FIG. 1 illustrates an airfield lighting system 100 with current level step detection, in accordance with example embodiments of the present disclosure. Referring to FIG. 1, the system 100 includes a control system 104, a constant current regulator (CCR) 106, and a plurality of light fixtures 108. In certain example embodiments, the control system 104 is located in a control tower 102 or other control facility. In certain example embodiments, the control system 104 is coupled to and controls operation of the CCR 106. In certain example embodiments, the control system 104 receives power from a power source, such as the power grid or an alternative power source, via switchgear components known to those skilled in this field. The CCR 106 converts the received AC voltage into output AC current and provides the AC current to the plurality of light fixtures 108. In certain example embodiments, the light fixtures are provided in series, thereby each receiving the same amount of current from the CCR 106. In the present example embodiments, the CCR 106 is operable at five current levels or steps, which is controlled by the control system 104. Thus, the control system 104 controls the current level provided to the light fixtures 108 by the CCR 106. Switching between current levels is a means of providing a communication signal to the light fixtures 108 via the CCR 106. Specifically, a certain current level transition sequence can be used to encode a corresponding operational instruction. The light fixtures 108 which receive the output current of the CCR 106 then detect the current level transition sequence. The light fixture 108 then decodes and carries out the corresponding operational instruction. In certain example embodiments, the current level transition sequence is detected when performed within a certain period of time (e.g., 10 seconds). In certain example embodiments, the sequence is detected when a specific pattern of level transitions are detected.

Figure 2:
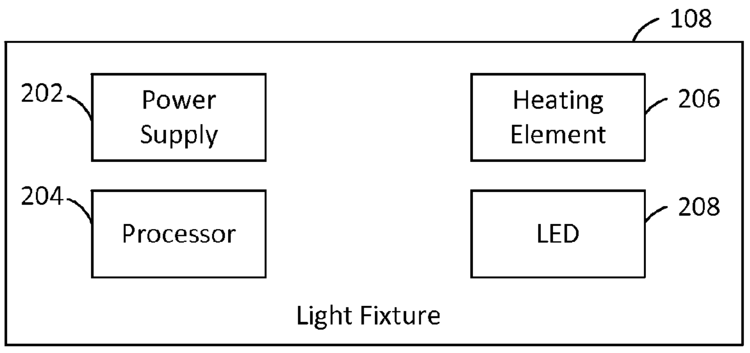
FIG. 2 illustrates a block diagram representation of a light fixture in the airfield lighting system, in accordance with example embodiments of the present disclosure.

FIG. 2 illustrates a block diagram representation of the light fixtures 108, in accordance with example embodiments of the present disclosure. Referring to FIG. 2, the example light fixture 108 includes a power supply 202, a processor 204, a heating element 206, and one or more LEDs 208. In certain example embodiments, the power supply 202 receives the current provided by the CCR 106 and converts the current into a smaller current for consumption by the LED 208. In certain example embodiments, the power supply 202 also powers the heating element 206. In certain such embodiments, the power supply 202 provides separate outputs for powering the heating element 206 and the LED 208. In certain example embodiments, the power supply 202 also powers one or more other components of the light fixture 108. The processor 204 is coupled to the power supply 202 and also receives the output current of the CCR 106. In certain example embodiments, the processor 204 is also communicatively coupled to the heating element 206 and/or the LED 208. In certain example embodiments, the processor 204 is preprogrammed or configured to detect certain current level transition sequences, and carry out the corresponding operational commands, which include controlling the heating element 206 and/or the LED 208. In certain example embodiments, the processor 204 includes a set of current level transition sequences and their individual corresponding operational commands such that the process can detect and decode a current level transition sequence.

Figure 3:
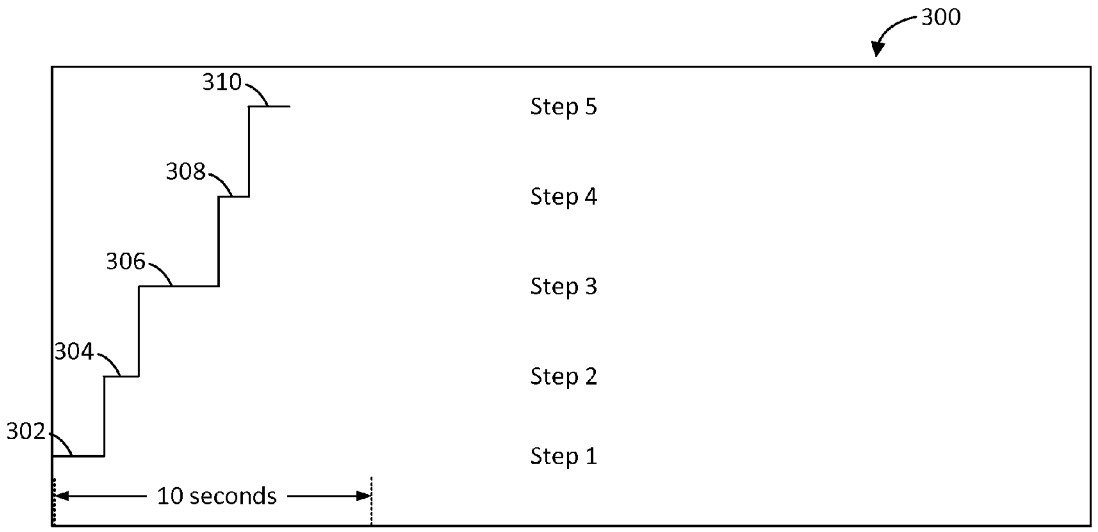
FIG. 3 illustrates an example current level transition sequence for turning on a heating element, in accordance with example embodiments of the present disclosure.
Figure 4:
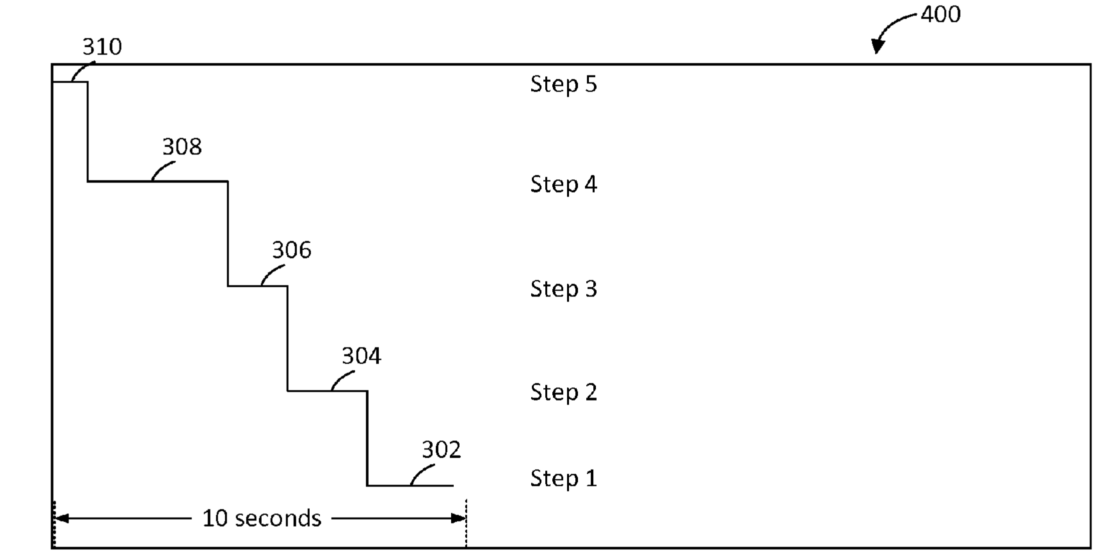
FIG. 4 illustrates an example current level transition sequence for turning off the heating element, in accordance with example embodiments of the present disclosure.

FIG. 3 illustrates an example current level transition sequence 300 for turning on the heating element 206, in accordance with example embodiments of the present disclosure. The different current levels output by the CCR 106 are represented in steps, in which the lowest current level corresponds to step 1 (302), and the highest current level corresponds to step 5 (310). In certain example embodiments, when the current output of the CCR 106 changes from step 1 (302), to step 2 (304), to step 3 (306), to step 4 (308), and to step 5 (310) within a ten second period, the processor 204 will detect the sequence as the current level transition sequence for turning the heating element 206 on, and carry out the command. Thus, the heating element 206 is turned on. FIG. 4 illustrates an example current level transition sequence for turning off the heating element 206, in accordance with example embodiments of the present disclosure. In certain example embodiments, when the current output of the CCR 106 changes from step 5 (310), to step 4 (308), to step 3 (306), to step 2 (304), and to step 1 (302) within a ten second period, the processor 204 will detect the sequence as the current level transition sequence for turning the heating element 206 off, and carry out the command. Thus, the heating element 206 is turned off. In certain example embodiments, the current level transition sequence is different for each unique control command. A particular current level transition sequence can be any pattern of one or more current level transitions, and not limited to the examples illustrated in FIGS. 3 and 4.

In certain example embodiments, the control system 104 can comprise a processing unit used to control the current level transitions of the CCR 106 through an automatic control scheme. For example, in one embodiment, the control system 104 automatically initiates the "heating element on" sequence in the CCR 106 when the temperature falls below a threshold temperature and then automatically initiates the "heating element off" sequence in the CCR 106 after a certain amount of time passes. In another example embodiment, the heating element 206 is automatically turned on and off periodically while the temperature is below the threshold temperature. In certain other example embodiments, the control system 104 controls the current level transitions of the CCR 106 based on manual operation of the control system 104 by a human user. For example, in one embodiment, the control system 104 includes one or more buttons or other user interface objects corresponding to various operational commands to be performed in the light fixture 108, such as turning the heating element 108 on or off, and/or changing the LED intensity. When a user activates a certain button, a signal is sent from the control system 104 to the CCR 106 and the corresponding current level transition sequence is initiated by the CCR 106. In certain example embodiments, a user can manually implement each current level transition via the control system 104.

In certain example embodiments, controlling of the CCR current transitions can be a combination of automatic and manual operations at the control system 104. In certain example embodiments, the transitions in a current level transition sequence do not need to occur in specified time slots for each transition, as many legacy CCRs are not configured to accommodate time slot dependent signaling schemes. However, in certain example embodiments, the entire sequence occurs within a predetermined period of time despite not requiring each individual step to be timed.

Figure 5:
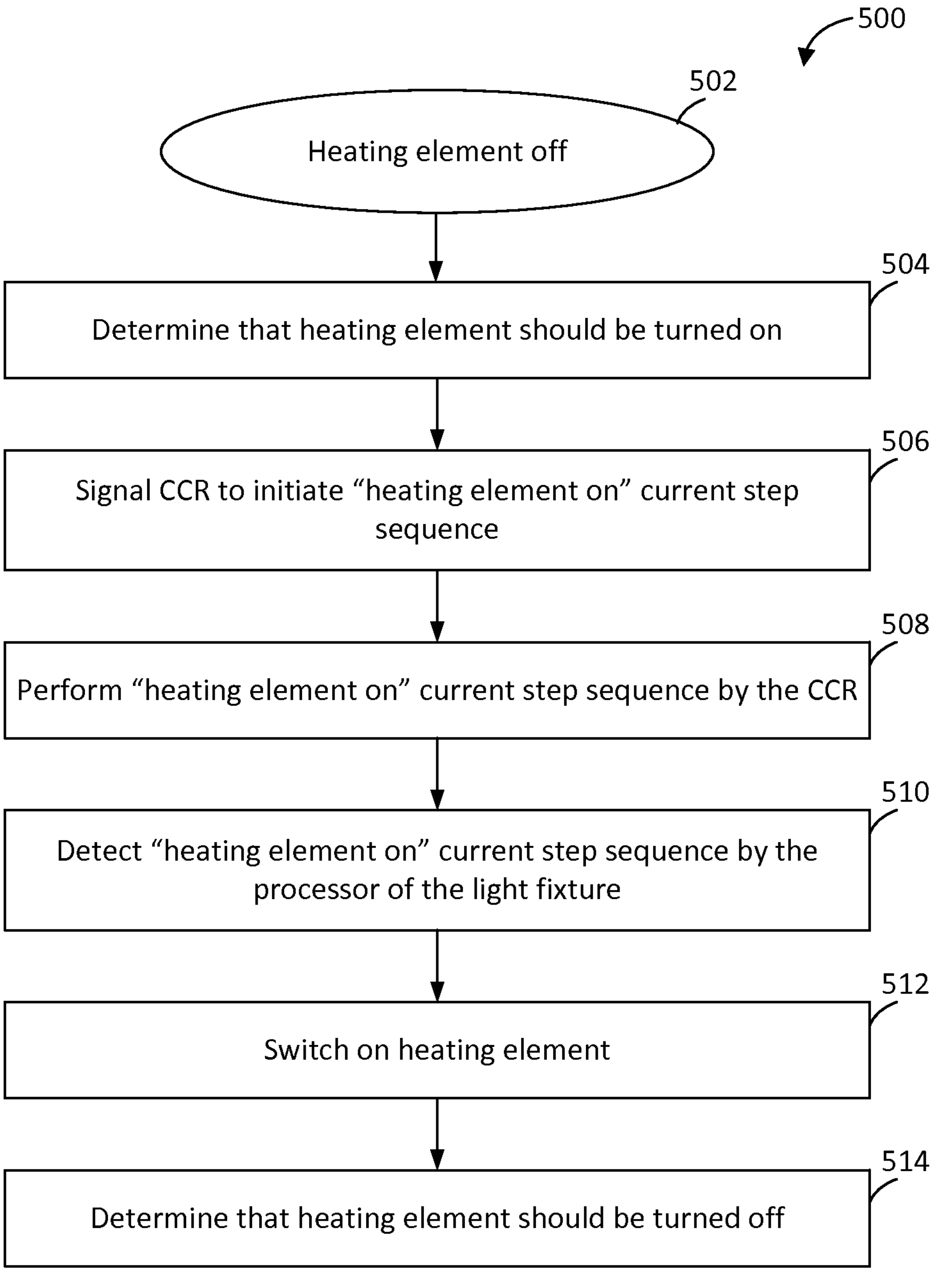
FIG. 5 illustrates a method of turning on the heating element through current level transition detection, in accordance with example embodiments of the present disclosure.

FIG. 5 illustrates a method of turning on a heating element, in accordance with example embodiments of the present disclosure. The method 500 beings with the heating element off (step 502). In certain example embodiments, the method 500 includes determining that the heating element should be turned on (step 504). This may be done via an automatic schedule or condition, manually by a user, or based on a combination of both. The method 500 further includes signaling the CCR to initiate the "heating element on" current step sequence (step 506). In certain example embodiments, this includes sending a control signal from the control system to the CCR. The method 500 further includes performing the "heating element on" current step sequence by the CCR (step 508). In this step, the current level delivered to the light fixture from the CCR goes through one or more level transitions, and in certain embodiments, over a predefined period of time. The method 500 further includes detecting the "heating element on" current step sequence by the processor of the light fixture (step 510). The method 500 further includes switching on the heating element in response to detecting the "heating element on" current step sequence (step 512). In certain example embodiments, the method 500 also includes determining that the heating element should be turned off (step 514). This could be an automatic or manual determination.

Figure 6:
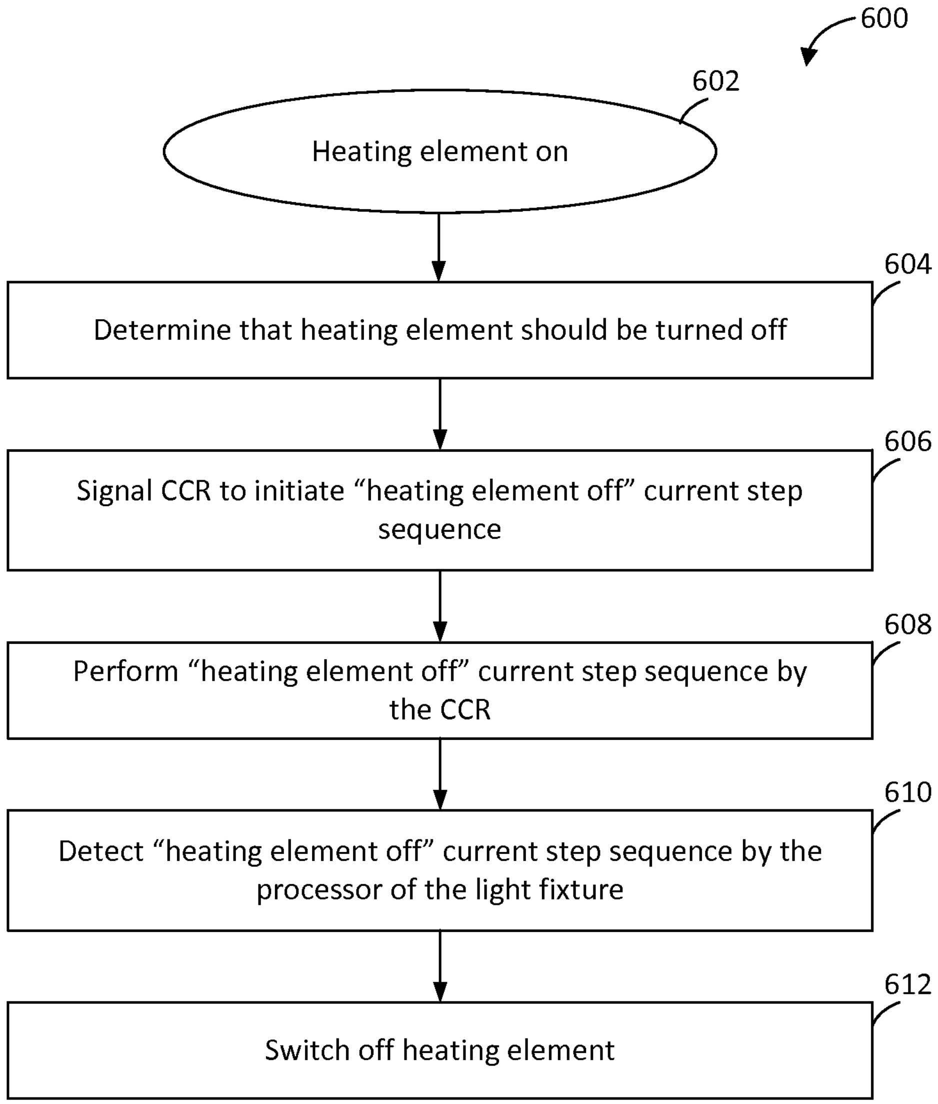
FIG. 6 illustrates a method of turning off the heating element through current level transition detection, in accordance with example embodiments of the present disclosure.

FIG. 6 illustrates a method of turning off a heating element, in accordance with example embodiments of the present disclosure. The method 600 beings with the heating element on (step 602). In certain example embodiments, the method 600 includes determining that the heating element should be turned off (step 604). The method 600 further includes signaling the CCR to initiate the "heating element off" current step sequence (step 606). In certain example embodiments, this includes sending a control signal from the control system to the CCR. The method 600 further includes performing the "heating element off" current step sequence by the CCR (step 608). In this step, the current level delivered to the light fixture from the CCR goes through one or more level transitions, and in certain embodiments, over a predefined period of time. The method 600 further includes detecting the "heating element off" current step sequence by the processor of the light fixture (step 610). The method 600 further includes switching off the heating element in response to detecting the "heating element off" current step sequence (step 612).

Figure 7:
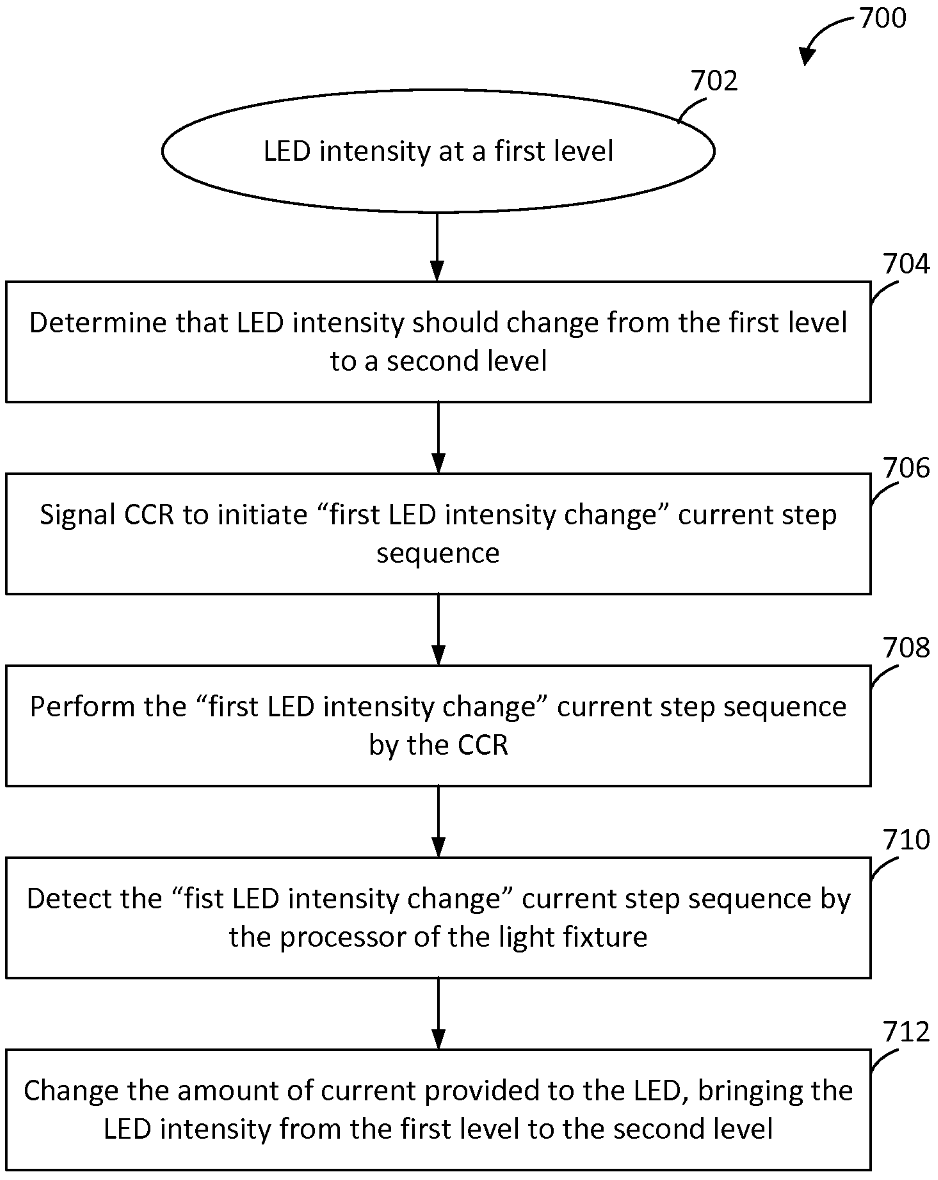
FIG. 7 illustrates a method of changing the LED light intensity from a first level to a second level through current level transition detection, in accordance with example embodiments of the present disclosure.

FIG. 7 illustrates a method of changing the LED light intensity from a first level to a second level, in accordance with example embodiments of the present disclosure. The method 700 beings with the LED intensity at the first level (step 702). In certain example embodiments, the method 700 includes determining that the LED intensity should change from the first level to the second level (step 704). This decision can be made automatically through a preprogrammed protocol or manual by a user. The method 700 further includes signaling the CCR to initiate a "first LED intensity change" current step sequence (step 706). The method 700 further includes performing the "first LED intensity change" current step sequence by the CCR (step 708). In this step, the current level delivered to the light fixture from the CCR goes through one or more level transitions, and in certain embodiments, over a predefined period of time. The method 700 further includes detecting the "first LED intensity change" current step sequence by the processor of the light fixture (step 710). The method 700 further includes changing the amount of current provided to the LED, thereby bringing the LED intensity from the first level to the second level (step 712).

The processors described herein in connection with the control system 104 and the light fixtures 108 can be implemented in a variety of ways as known to those skilled in the relevant field. Those skilled in the relevant field will readily understand that one or more processors herein can be implemented with one or more memory/storage components, one or more input/output (I/O) devices, and a bus structure that allows the various components and devices to communicate with one another. A memory/storage component can include volatile computer-readable media (such as random access memory (RAM)) and/or nonvolatile computer-readable media (such as read only memory (ROM), flash memory, optical disks, magnetic disks, and so forth). Generally speaking, the processors referenced herein can include at least the minimal processing, input, and/or output means necessary to practice one or more embodiments.

Various techniques are described herein in the general context of software or program modules. Generally, software includes routines, programs, objects, components, data structures, and so forth that perform particular tasks or implement particular data types. Implementation of these modules and techniques are stored on or transmitted across some form of computer readable media. Computer readable media is any available non-transitory storage medium that is accessible by a processor or computing device.

Although the inventions are described with reference to example embodiments, it should be appreciated by those skilled in the art that various modifications are well within the scope of the invention. From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the example embodiments, equivalents of the elements shown therein will suggest themselves to those skilled in the art, and ways of constructing other embodiments of the present invention will suggest themselves to practitioners of the art. Therefore, the scope of the present invention is not limited herein.

What is claimed is:

1. An airfield lighting system, comprising:

a control system that is communicatively coupled to a constant current regulator and that transmits operational command signals to control an operation of the constant current regulator;

the constant current regulator provides constant current to a plurality of light fixtures, wherein the constant current regulator provides power at a plurality of current levels, wherein the operational command signals received from the control system initiate the constant current regulator to output a current level transition sequence, and wherein the current level transition sequence comprises a sequence of changes in a current level between the plurality of current levels within a predefined time period; and the plurality of light fixtures electrically coupled to each other and with the constant current regulator such that the plurality of light fixtures are powered by the constant current regulator, wherein each of the plurality of light fixtures comprises a processor, a heating element, and a light emitting diode (LED), wherein the processor of at least one of the plurality of light fixtures receives and detects the current level transition sequence, and wherein the processor of the at least one light fixture controls an operation of the heating element that generates heat upon detection of the current level transition sequence.

2. The airfield lighting system of claim 1, wherein a time period of one or more current level changes within the predefined time slot varies from each other.

3. The airfield lighting system of claim 1, wherein a first current level transition sequence output from the constant current regulator turns on the heating element, wherein the control system instructs the constant current regulator to initiate the first current level transition sequence when the control system determines that an ambient temperature falls below a threshold temperature value, and wherein a second current level transition sequence output from the constant current regulator turns off the heating element based on a corresponding operational command signal from the control system.

4. The airfield lighting system of claim 1, wherein the current level transition sequence changes the light intensity of a light source within the at least one light fixture.

5. The airfield lighting system of claim 1, wherein the current level transition sequence comprises the sequence of current level changes selected from a group of the plurality of current levels consisting of 2.8 A, 3.4 A, 4.1 A, 5.2 A, and 6.6 A.

6. A method of operating an element of a light fixture in an airfield lighting system, comprising:

determining, by a control system, that the element should be turned on;

signaling, by the control system, a constant current regulator that is communicatively coupled to the control system to initiate a current level transition sequence, wherein the constant current regulator is electrically coupled to a plurality of light fixtures and provides constant current to the plurality of light fixtures, wherein the constant current regulator provides power at a plurality of current levels, wherein the current level transition sequence comprises a sequence of changes in a current level between the plurality of current levels within a predefined time period;

outputting the current level transition sequence from the constant current regulator to the plurality of light fixtures of the airfield lighting system, wherein each of the plurality of light fixtures comprises a processor, the element, and a light source;

detecting the current level transition sequence by the processor associated with the light fixture, wherein the light fixture is included in the plurality of light fixtures;

wherein responsive to detecting the current level transition sequence, the processor actuates the element, wherein the element is a heating element that generates heat.

7. The method of claim 6, wherein actuating the heating element comprises turning the heating element on or off.

8. The method of claim 6, wherein responsive to detecting the current level transition sequence, the processor of the light fixture changes an intensity of light emitted from the light source.

9. The method of claim 6, wherein determining that the element should be turned on is a preprogrammed protocol, a user input, or a combination.

10. The method of claim 6, wherein the current level transition sequence comprises the sequence of current level changes selected from a group of the plurality of current levels consisting of 2.8 A, 3.4 A, 4.1 A, 5.2 A, and 6.6 A.

11. A non-transitory computer-readable medium comprising computer-executable instructions, the computer-executable instructions performing the following steps when executed by a processor installed in at least one of a plurality of light fixtures in an airfield lighting system:

receiving, at the processor from a constant current regulator that is communicatively coupled to a control system, a current level transition sequence, wherein the control system generates and transmits one or more control signals to the constant current regulator to initiate the current level transition sequence, wherein the constant current regulator is electrically coupled to the plurality of light fixtures that are electrically coupled to each other and provides constant current to the plurality of light fixtures, wherein the current level transition sequence comprises a sequence of changes in a current level supplied by the constant current regulator to the plurality of light fixtures in the airfield lighting system, and wherein the constant current regulator supplies a plurality of current levels to the plurality of light fixtures;

detecting the current level transition sequence by the processor installed in the at least one light fixture, the processor controlling an element in the at least one light fixture, wherein the at least one light fixture comprises the processor, the element, and a light source, and wherein the element is a heating element that generates heat; and actuating the element via the processor responsive to detecting the current level transition sequence.

12. The non-transitory computer-readable medium of claim 11, wherein actuating the element comprises turning on the heating element.

13. The non-transitory computer-readable medium of claim 11, wherein responsive to detecting the current level transition sequence, the processor of the at least one light fixture changes an intensity of light emitted from the light source.

* * * * *